United States Patent [19]

Kitamura et al.

[11] 4,220,979
[45] Sep. 2, 1980

[54] BIAS LEVEL SETTING CIRCUIT FOR TAPE RECORDERS WITH STAIRCASE HIGH FREQUENCY SIGNAL

[75] Inventors: Masatsugu Kitamura; Hideo Onoye; Masami Yamazaki, all of Yokohama, Japan

[73] Assignee: Victor Company of Japan, Limited, Japan

[21] Appl. No.: 24,875

[22] Filed: Mar. 28, 1979

[30] Foreign Application Priority Data

Mar. 29, 1978 [JP] Japan .................................. 53-35485

[51] Int. Cl.² ................................................ G11B 5/47
[52] U.S. Cl. ...................................................... 360/66
[58] Field of Search ...................................... 360/66, 68

[56] References Cited

U.S. PATENT DOCUMENTS

| | | | |
|---|---|---|---|
| 4,011,585 | 3/1977 | Sunzga | 360/66 |
| 4,038,692 | 7/1977 | Umeda et al. | 360/66 |

Primary Examiner—Vincent P. Canney
Attorney, Agent, or Firm—Lowe, King, Price & Becker

[57] ABSTRACT

An automatic bias level setting circuit for tape recorders includes a variable loss attenuator for stepwisely increasing the level of a high frequency bias signal which is superposed on a constant amplitude audio test signal. The recorded signal is detected by means of an envelope detector coupled to the playback head and fed into a resettable integrator for integrating the input signal in response to each stepwise variation of the signal to generate a series of sawtooth waves. The output of the integrator is coupled to a maximum peak detector to detect the maximum peak point of the recorded test signal to determine an optimum bias level in relation to the detected peak point.

7 Claims, 7 Drawing Figures

BIAS LEVEL SETTING CIRCUIT FOR TAPE RECORDERS WITH STAIRCASE HIGH FREQUENCY SIGNAL

BACKGROUND OF THE INVENTION

The present invention relates generally to tape recording and reproducing apparatus and more particularly to a circuit arrangement for automatically establishing an optimum level of a high-frequency bias signal according to different magnetic properties of magnetic tape.

A bias oscillator is provided in tape recorders to generate a high frequency signal in the ultrasonic range for magnetically biasing the recording tape to give it a linear recording characteristic. Because of the different magnetic characteristic of the recording tape between tapes of different materials such as normal tape and chrome tape, the biasing level must be adjusted to meet the specific properties of the tape being used. For this purpose, high quality tape recorders have hitherto been provided with means for manually adjusting the biasing level and the equalizer characteristic of recording and playback amplifiers. However, the manual adjustment is a tedious affair and often results in an error should the user erroneously identify the material of tape. Even though such erroneous material identification is rare, the magnetic characteristic of even tapes of the same type differs slightly.

Japanese Patent Application No. 77-104111 discloses an apparatus for automatically setting the bias level by continuously sweeping the bias level from low to high levels while recording a test signal and continuously tracking the instantaneous value of a signal picked up by the playback head throughout the range of sweep to detect an optimum bias level. Because the bias level is determined by the instantaneous value of the recorded test signal, the loss of a recorded signal occurring in the magnetic tape is likely to result in a biasing error. This problem is particularly severe in cases where cassette tapes are employed because of their noticeable variations in recorded signal level.

SUMMARY OF THE INVENTION

Accordingly, an object of the invention is to provide an improved automatic bias level setting circuit which is free from the disadvantage of the prior art.

The automatic bias level setting circuit of the invention comprises a variable loss attenuator which is connected to the output of a high-frequency bias signal source. The variable loss attenuator is responsive to a binary input signal to impart a stepwisely varying attenuation to the bias signal so that the bias level stepwisely increases. The stepwisely varying bias signal is superposed on a constant amplitude audio test signal and recorded on a tape. Because of the magnetic characteristics of the recording tape, the amplitude of the recorded signal increases until a saturation point is reached whereupon the amplitude decreases. This results in a staircase waveform having a maximum peak corresponding to the saturation point. This waveform is detected by means of an envelope detector connected to the reproducing head of the tape recorder and fed into a resettable integrator. The integrator is arranged to effect integration of the detected waveform in response to a reset pulse to generate a series of sawtooth waves each having a different rate of rise depending on the input level of each voltage step. The output of the integrator is used to detect the maximum peak level of the recorded bias staircase waveform to determine an optimum bias level in relation to the detected maximum point. Because of the time integration, an instantaneous reduction in the signal level will not adversely affect the integrator output and an erroneous setting of bias level is not likely to result.

A microcomputer may be advantageously employed to operate the tape recorder in various modes to generate the staircase bias signal and process the output of the integrator to determine the optimum bias level.

Preferably, the output of the integrator is coupled to a comparator which compares it with a fixed reference to generate a signal at one of two discrete levels depending on whether the input signal is above or below the reference. The output of the comparator is advantageously processed in the microcomputer to detect the length of the comparator output which is a digital representation of the level of each step voltage to detect the maximum peak point of the detected waveform, and to determine the optimum bias level in relation to the detected peak point.

BRIEF DESCRIPTION OF THE DRAWINGS

The invention will be further described by way of example with reference to the accompanying drawings, in which.

DESCRIPTION OF THE PREFERRED EMBODIMENTS

Figure 1:
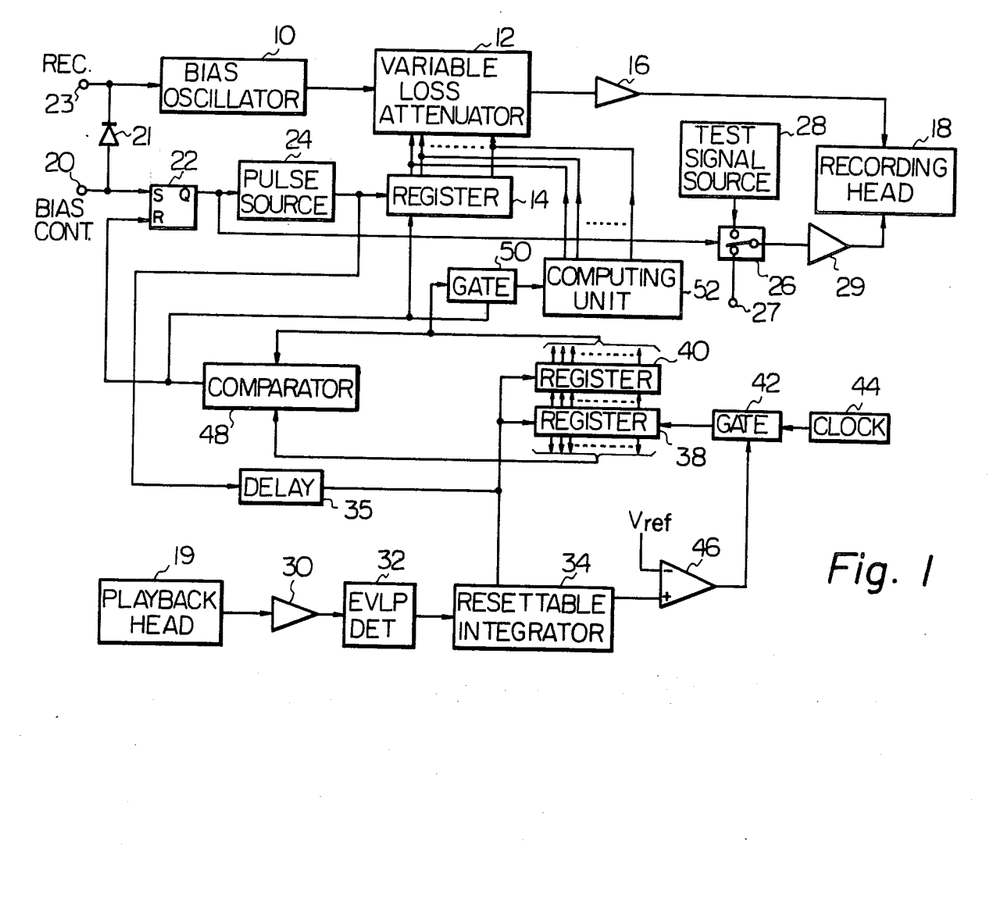
FIG. 1 is a schematic block diagram of a first embodiment of the present invention.

Referring now to FIG. 1 of the drawings, an embodiment of the present invention is schematically illustrated. This embodiment is particularly suitable for tape recorders wherein recording and playback heads are provided separately for individual functions. The automatic bias level setting circuit of the invention includes a bias oscillator 10 which generates a 100 kHz constant amplitude signal and feeds it to a variable loss attenuator 12 wherein the input signal undergoes a certain degree of attenuation in accordance with a set of binary signals from a shift register 14. The attenuated high-frequency signal is amplified at 16 and applied to the recording head 18. A bias control signal terminal 20 is provided to trigger a flip-flop 22 into a set condition on manual command, when the operator manipulates a corresponding key (not shown), and activate a pulse source 24 and a switch 26. The pulse source 24 provides the register 14 with a train of shift pulses at a constant rate to allow it to generate a binary signal which appears on its output terminals as a set of different binary levels, so that the shift register 14 updates its stored contents in response to each input pulse. When the switch 26 is activated in response to the enable pulse from circuit 22, a signal from a test signal source 28 is coupled to the recording head 18 through an amplifier 29. This test signal is a constant frequency signal in the audible frequency to serve as a substitute for the actual recording signal. The test signal is superposed with the high-frequency bias signal and recorded on tape.

The bias oscillator 10 is activated in response to the signal from the bias control terminal 20 through a diode 21 or in response to a signal from a recording mode terminal 23. As the contents of the shift register 14 are updated in response to the pulse from the source 24, the variable loss attenuator 12 decreases the amount of its loss stepwisely resulting in the generation of a staircase waveform of the bias signal with the amplitude increasing with time. In other words, the register 14 stepwisely sweeps the voltage level of the bias signal from a low value to a high value.

The playback head 19 picks up the recorded signal and feeds it through an amplifier 30 to an envelope detector 32. The output of the envelope detector 32 is a DC voltage of a staircase waveform corresponding to the staircase waveform generated from the variable loss attenuator 12 that has undergone a variation in accordance with the particular magnetic characteristic of the tape as will be described later. The detected staircase waveform is applied to a resettable integrator 34 which successively integrates the input signal in response to a reset signal which is applied from the pulse source 24 through a delay circuit 35 which introduces a delay interval corresponding to the time the magnetic tape takes to travel from the position of the recording head 18 to the position of the playback head 19. The delay pulse is also used to trigger shift registers 38 and 40 to cause the shift register 38 to accept clock pulses from a clock source 44 through a gate 42 in response to an output signal from a comparator 46. The contents of the shift register 38 are replaced successively with the data indicating the number of clock pulses which is a measure of the magnitude of each of the successively generated integrated voltages. The stored contents of the shift register 38 are transferred to the shift register 40 in response to each reset pulse, whereby the contents of the shift register 40 represent a measure of the magnitude of the previous integrator output and the contents of the shift register 38 represent a measure of the magnitude of the subsequent integrator output. The outputs of the shift registers 38 and 40 are fed into a comparator 48 in which the contents of the shift registers are compared to generate an output when the contents of registor 40 are smaller than the contents of register 38. The shift registers 38, 40 and comparator 48 thus act as a maximum peak detector. The comparator 48 output is coupled to a gate 50 to transfer the contents of the shift registor 40 to a computing unit 52 which processes the input binary signals in a manner as will be described later and provides a level setting signal in a binary form and supplies it on a plurality of output leads to the variable loss attenuator 12.

Figure 2:
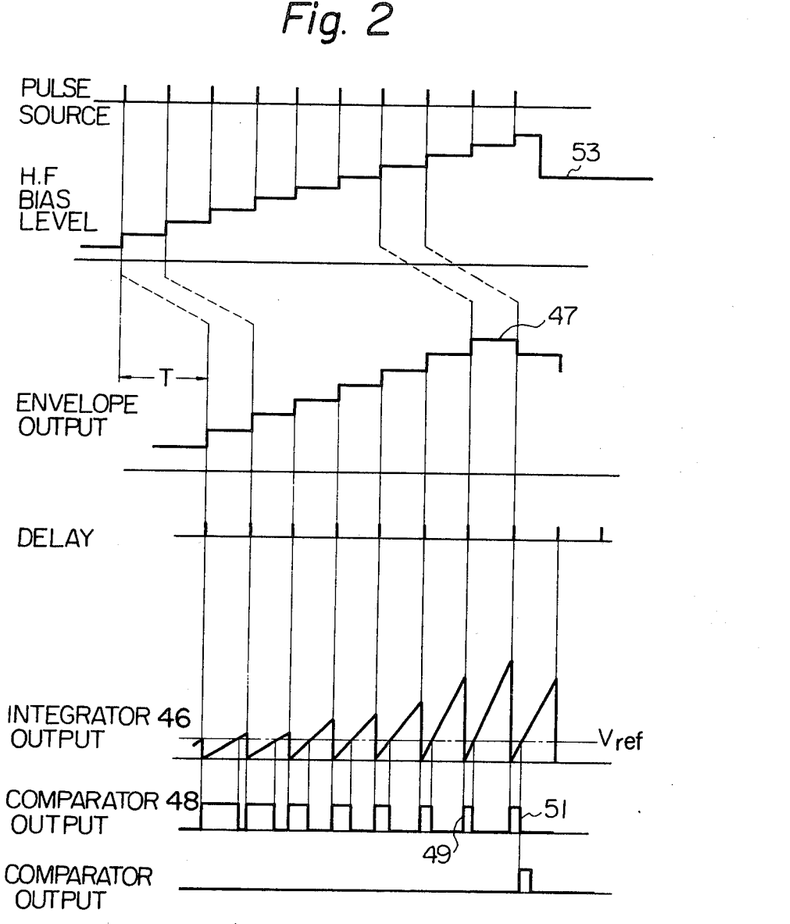
FIG. 2 is a waveform diagram showing the operation of the embodiment of FIG. 1.

The operation of the embodiment of FIG. 1 is best understood with reference to waveforms shown in FIG. 2. A bias control signal on terminal 20 causes the flip-flop 22 to trigger the pulse source 24 and the tape recorder to operate in a recording mode. The variable loss attenuator 12 is initially set at a maximum value which imparts a maximum amount of attenuation to the input bias signal from the oscillator 10, so that the attenuator output signal is initially at a minimum level. In response to each input trigger pulse from source 24, the register 14 changes its output binary states to cause the variable attentuator 12 to reduce its insertion loss to stepwisely increase the signal level of the high-frequency bias signal. Therefore, the magnitude of the bias signal is swept across a range from a low to a high signal level in stepwise fashion and this bias signal is recorded on a tape in superposition on the test signal which is coupled through switch 26 to the recording head 18.

Figure 6:
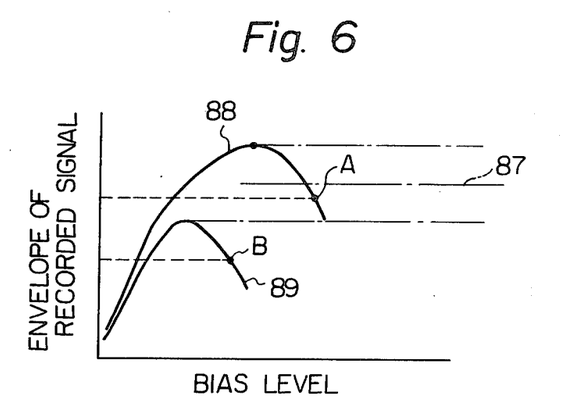
FIG. 6 is a graphic representation of the magnetic characteristics of different tapes.

After a delay interval T the recorded signal on the tape is detected by the envelope detector 32. The detected DC voltage increases with time stepwisely until it reaches a maximum level whereupon it starts to decrease in accordance with the magnetic properties of the tape being used. FIG. 6 shows a plot of the recorded signal envelope value as a function of the amplitude of high-frequency bias signal for normal and chrome tapes. As seen from FIG. 6, the maximum value of the envelope detector output appears at different magnitudes of the bias signal and accordingly the appropriate bias point differs between different magnetic tapes. The appropriate bias point is well known to exist at a point A for chrome tape and at a point B for normal tape which corresponds to $(1-k)$ times the maximum signal level, where k is a constant, and occurs on the higher side of each maximum point on the curves.

Responsive to the delayed trigger pulses the registers 38 and 40 are alternately enabled to accept pulses from the clock source 44 and the integrator 34 is reset to receive the output of the envelope detector 32. Since the integrated output rises at a rate in proportion to the level of input signal, a series of sawtooth waves appears at the input to the comparator 46, with the amplitude of each sawtooth wave increasing as a function of time until the maximum level 47 is detected, and whereupon it starts to decrease. The comparator 46 input is compared with a reference voltage Vref to produce a high level output when the input signal is lower than the reference value. Therefore, it will be noted that a series of pulses occurs at the output of the comparator 46 and the duration of each pulse varies inversely as a function of the detected DC voltage level, so that a pulse 49 having a minimum duration corresponds to the detected maximum level 47. The gate 42 is held open in response to each of the comparator 46 output pulses to pass the clock pulses to the registers 38 and 40. As a result, when the data generated in response to a gate signal 49 is stored in register 40, the data generated in response to a gate signal 51 is stored in register 38. Since the contents of the register 40 are smaller than those of register 38, the comparator 48 generates an output indicating that a maximum point has been detected and applies it to flip-flop 22 and to register 14 for purposes of resetting them to the initial conditions. The switch 26 thus returns to its normal position to connect the input recording signal, applied to terminal 27, to the recording head 18 in place of the test signal. Simultaneously, the gate 50 is activated to transfer the contents of register 38 to the computing unit 52 wherein the input signal is multiplied by a factor of $(1+k)$ so that the multiplied output corresponds to the $(1-k)$ point of the maximum signal level of the characteristic curve of the tape now under test and the appropriate bias level is determined so that it corresponds to the $(1-k)$ point on the higher side of the maximum point. The binary representation of the detected bias level is applied through the output leads of computing unit 52 to the variable loss attenuator 12 for purposes of resetting it to an optimum value of insertion loss which sets the bias signal applied to the recording head 18 to a level as indicated by numeral 53 (FIG. 2).

Assume that a dropout has occurred in the recorded signal, resulting in a reduction in output signal level of the envelope detector for a short period of time. Because of the time integral action of the integrator 34, such a dropout will be less likely to result in a total loss of signal or a substantial reduction of the signal to a level lower than the preceding step height.

Figure 3:
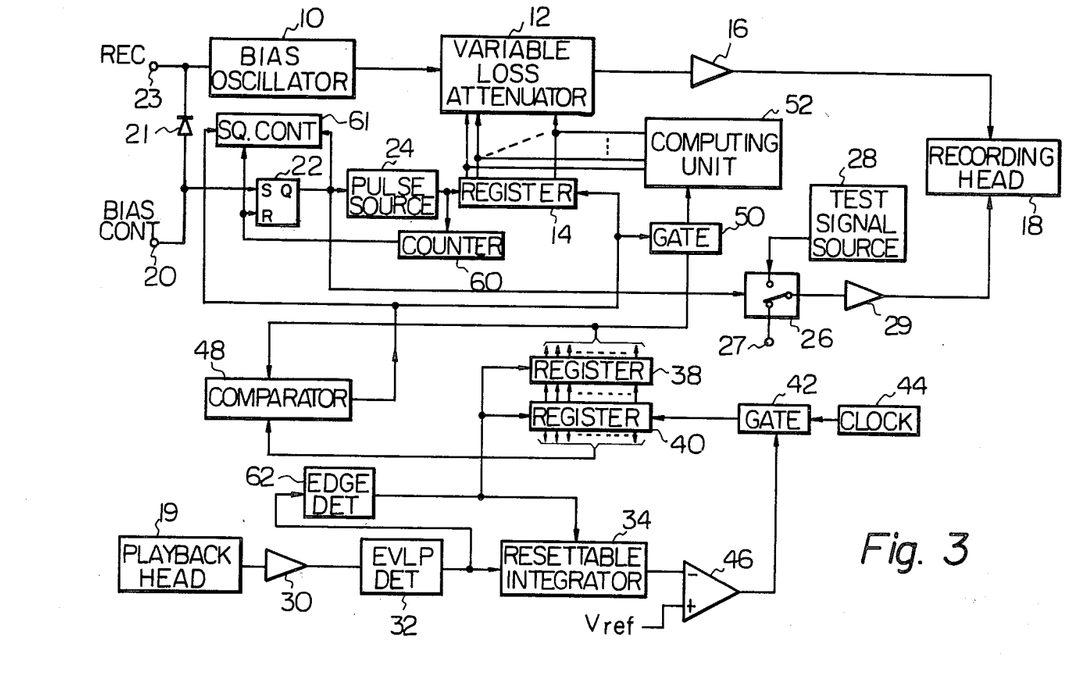
FIG. 3 is a schematic block diagram of a second embodiment of the invention.
Figure 5:
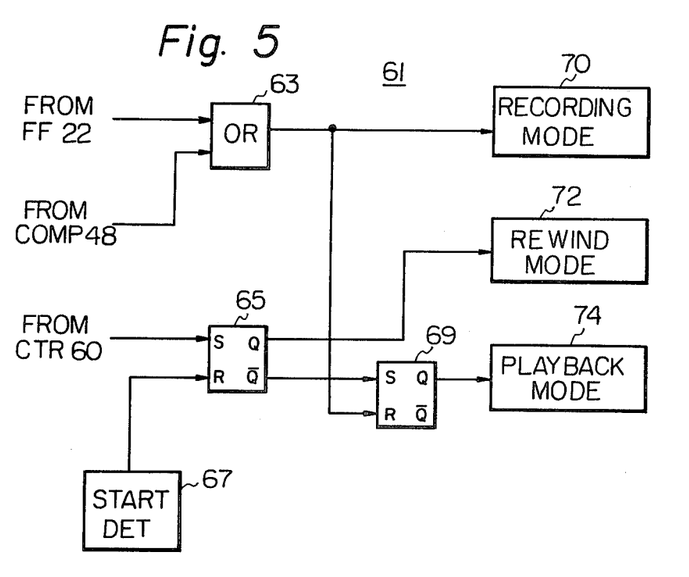
FIG. 5 is a detailed diagram of the sequence control circuit of FIG. 3.

FIG. 3 is an illustration of a modified embodiment of the present invention in which the same numerals are used to designate the same parts as employed in the circuit of FIG. 1. The modified embodiment is particularly suitable for tape recorders having a single transducer head which is adapted to operate as a recording and playback head. In FIG. 3, however, the recording and playback heads are illustrated as separate elements for purposes of disclosure. The FIG. 3 embodiment is generally similar to the FIG. 1 embodiment with the exception that a pulse counter 60 is coupled to the output of the pulse source 24 to generate an output when a predetermined number of trigger pulses has been applied to the register 14 to reset the flip-flop 22, whereby the variable loss attenuator 12 is caused to vary its insertion loss in 32 discrete steps, for example. The tape recorder is operated in various modes in response to a sequence controller 61 which, as illustrated in a greater detail in FIG. 5, includes an OR gate 63 through which the output signals from the flip-flop 22 and the comparator 48 are coupled to a recording mode mechanism 70 and to the reset input of a flip-flop 69.

Figure 4:
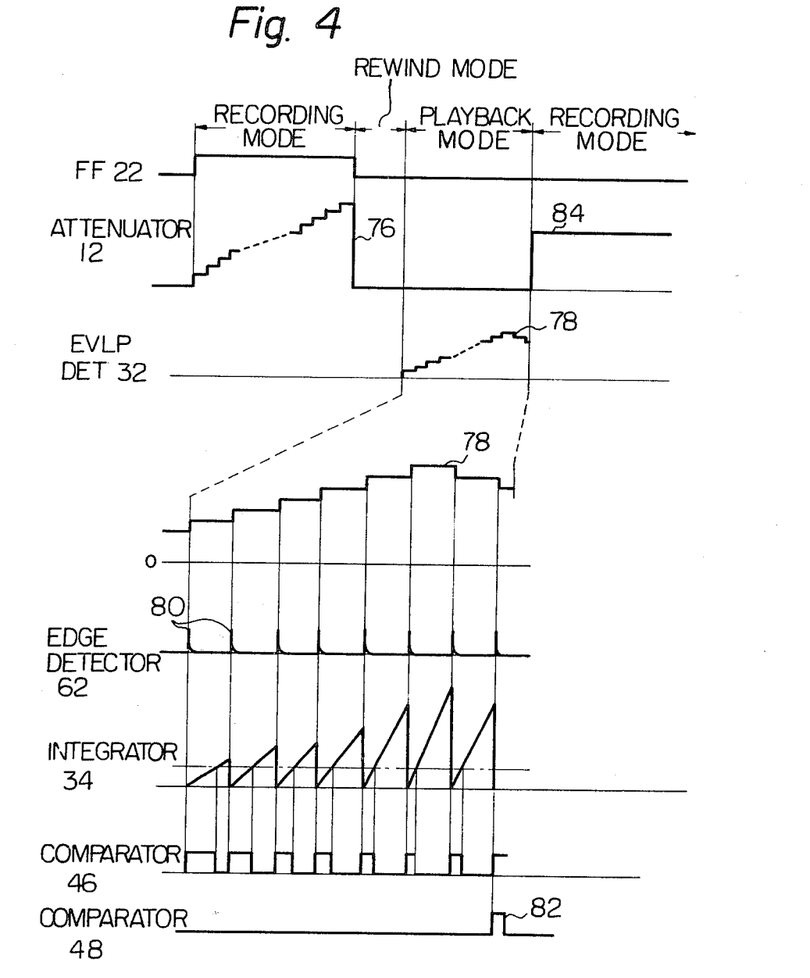
FIG. 4 is a waveform diagram showing the operation of the embodiment of FIG. 3.

In response to application of a bias control signal to terminal 20, the flip-flop 20 is triggered into set condition to permit the pulse source 24 to generate a train of trigger pulses. In addition, the high output of flip-flop 22 is applied through OR gate 63 to the recording mode mechanism 70 so that the tape recorder is now set into a recording mode to allow the staircase bias signal to be recorded on the tape in superposition on the test signal. When the counter 60 has received 32 input pulses, it provides a reset signal to the flip-flop 22 and to the set input of a flip-flop 65 to the sequence controller 61 to operate the rewind mode mechanism 72. A high frequency staircase bias waveform 76 (see FIG. 4) is thus recorded on the tape with the amplitude variation in accordance with the magnetic characteristic of the tape being used as described above. When the tape is rewound to the initial position, the flip-flop 65 is reset in response to an output signal from a tape start detector 67. The output signal from the flip-flop 65 is thus switched from its true to complementary outputs to trigger a flip-flop 69 and hence a playback mode mechanism 74. In this playback mode the recorded signal is detected by envelope detector 32 to generate an output which may appear as a waveform 78. The output of the envelope detector 32 is applied to the resettable integrator 34 on the one hand and to an edge detector 62 on the other hand. The edge detector 62 essentially comprises a differentiator and a suitable diode arrangement which aligns the polarities of the differentiated output signals. Pulses 80 are each generated from the edge detector 62 in response to each step of the detected DC voltage 78 and used to trigger the registers 38 and 40 in the same manner as in the previous embodiment. The pulse 80 is also used to reset the integrator 34 to allow it to successively integrate the different step voltages of the waveform 78 as in the previous embodiment. When the comparator 48 produces an output pulse 82, the register 14 is cleared and gate 50 is enabled to transfer the contents of register 38 to the computing unit 52 wherein the input binary signal is processed in the same manner as described above to set up an appropriate bias level designated by numeral 84 in FIG. 4. The comparator 48 output is also coupled to the sequence controller 61 to terminate the playback operation and initiate recording operation.

Figure 7:
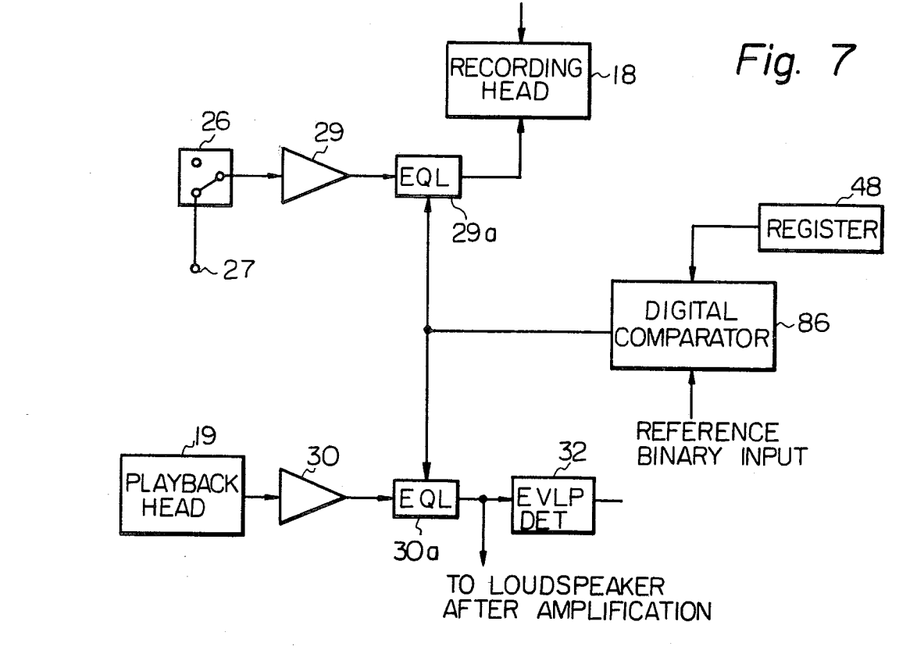
FIG. 7 is a schematic diagram of a modification of the embodiments of FIGS. 1 and 3.

It is known that the frequency response characteristic of magnetic tapes is different between different types of tape and it is a usual practice in the art of tape recorders to provide the amplifiers 29 and 30 of the previous embodiments with equalizers. These equalizers are shown in FIG. 7 by separate blocks 29a and 30a respectively connected to the amplifiers 29 and 30. The frequency characteristics of the equalizers 29a and 30a are preferably changed according to different types of tape being used so as to compensate for the different frequency response. In practical embodiment, the equalizers 29a and 30 are designed to have a time constant of 120 microseconds for normal tape reproduction and a time constant of 70 microseconds for chrome tape reproduction. The switching of the time constant values between 120 and 70 microseconds is achieved by means of a control signal provided from a digital comparator 86 which receives the binary output from the shift register 38 and a reference binary input corresponding to a level 87 shown in FIG. 6 which lies between the maximum levels of the curves 88 and 89. The comparator 86 discriminates between the normal and chrome tapes by detecting the deviation of the contents of the register 38 from the setting binary level and causes the equalizers 29a and 30a to switch to a 120-microsecond time constant when the stored value of the register 38 is greater than the reference when a chrome tape (curve 89) is used and switch to a 70-microsecond time constant in response to the comparator 86 detecting that the stored value of the register 40 is smaller than the reference value when a normal tape (curve 88) is used.

The present invention can also be achieved by means of a microcomputer of any conventional type. The use of a microcomputer is advantageous because of its versatility to provide different functions by simply changing its stored program which is obvious to the skilled programmer to prepare when reading the foregoing description.

What is claimed is:

1. An automatic bias level setting circuit for a tape recorder having a bias oscillator for generating an ultrasonic frequency signal of a constant amplitude, comprising:

means for stepwisely varying the signal level of said ultrasonic frequency bias signal as a function of time for application to an electromagnetic transducer head of said tape recorder operating as a recording head;

a source for generating an audible frequency test signal of a constant amplitude for application to said recording head to record said test signal in superposition with said stepwisely varying bias signal;

an envelope detector connected to said electromagnetic transducer head of the tape recorder operating as a playback head to detect the envelope of said recorded signal;

a resettable integrator connected to the output of said envelope detector for integrating a signal from said envelope detector;

means for resetting said integrator in response to a stepwise variation of said signal from said envelope detector;

means for detecting the maximum value of a signal from said integrator; and means connected to said maximum detecting means for determining a signal level corresponding to a predetermined ratio of said detected maximum value and holding said stepwisely varying means to said determined signal level.

2. An automatic bias level setting circuit as claimed in claim 1, wherein said maximum detector comprises a comparator having an input terminal connected to the output of said resettable integrator and another input biased at a reference level to generate a signal at one of two discrete values depending on whether the output signal from said integrator is above or below said reference value and means for successively measuring the time period of said signal from said comparator in response to said resetting means and detecting when the measured time period of a previously generated signal is smaller than the measured time period of a subsequently generated signal.

3. An automatic bias level setting circuit as claimed in claim 1, wherein said resetting means comprises a pulse source and means for introducing a delay interval to a pulse from said pulse source corresponding to the time a magnetic tape travels from the position of said recording head to the position of the playback head for resetting said integrator in response to the delayed pulse.

4. An automatic bias level setting circuit as claimed in claim 3, wherein said stepwisely varying means comprises a variable loss attenuator for passing a signal from said bias oscillator to said recording head and a shift register receptive of pulses from said pulse source for generating a binary signal upon receipt of each said pulse for causing said variable loss attenuator to decrease the amount of its loss stepwisely in accordance with said binary signal.

5. An automatic bias level setting circuit as claimed in claim 1, wherein said resetting means comprises means connected to said envelope detector for detecting stepwise variations of a signal from said envelope detector and resetting said integrator in response to the detected stepwise variation.

6. An automatic bias level setting circuit as claimed in claim 5, further comprising means for operating said tape recorder in one of a plurality of selectable operational modes including means for permitting said stepwisely varying bias signal and said test signal to be recorded simultaneously on a tape and permitting the recorded signal to be reproduced.

7. An automatic bias level setting circuit as claimed in any one of the preceding claims, further comprising a first equalizer for equalizing a recording signal and a second equalizer for equalizing a signal from said playback head, each of said first and second equalizers having a plurality of selectable equalization characteristics, and means for detecting whether the output signal from said integrator is above or below a preselected reference level and selecting one of said equalization characteristics in response to the detected output signal.

* * * * *